(12) United States Patent
Doorhy et al.

(10) Patent No.: US 7,000,468 B2
(45) Date of Patent: Feb. 21, 2006

(54) ELECTRONIC LEVEL GAUGE

(75) Inventors: Brendan Doorhy, Westmont, IL (US); Michael Pelland, Medinah, IL (US); Corey Pelland, Gurnee, IL (US); Jon Alling, Schaumburg, IL (US)

(73) Assignee: Bunn-O-Matic Corporation, Springfield, IL (US)

( * ) Notice: Subject to any disclaimer, the term of this patent is extended or adjusted under 35 U.S.C. 154(b) by 0 days.

(21) Appl. No.: 10/817,078

(22) Filed: Apr. 2, 2004

(65) Prior Publication Data

US 2005/0016267 A1 Jan. 27, 2005

Related U.S. Application Data

(60) Provisional application No. 60/460,555, filed on Apr. 4, 2003.

(51) Int. Cl.
*G01F 23/00* (2006.01)

(52) U.S. Cl. .......................................... 73/301; 73/299

(58) Field of Classification Search ................. 73/299, 73/715, 323, 290 R, 301, 302; 222/23
See application file for complete search history.

(56) References Cited

U.S. PATENT DOCUMENTS

| | | | | |
|---|---|---|---|---|
| 3,592,219 A | | 7/1971 | Giese et al. ................. 137/242 |
| 3,803,917 A | * | 4/1974 | Reese et al. .................. 73/708 |
| 3,904,174 A | | 9/1975 | Giese ......................... 251/331 |
| 4,022,062 A | | 5/1977 | Basel et al. ................... 73/325 |
| 4,044,998 A | | 8/1977 | Giese ......................... 251/331 |
| 4,166,606 A | | 9/1979 | Kawolics et al. ............ 251/214 |
| 4,343,184 A | * | 8/1982 | Jaulmes ........................ 73/299 |
| 4,630,478 A | | 12/1986 | Johnson ....................... 73/299 |
| 4,669,309 A | | 6/1987 | Cornelius .................... 73/299 |
| 4,747,062 A | | 5/1988 | Esau ........................... 364/509 |
| 5,105,662 A | * | 4/1992 | Marsh et al. ................. 73/299 |
| 5,163,324 A | | 11/1992 | Stewart ....................... 73/302 |
| 5,167,155 A | | 12/1992 | Rodgers ...................... 73/299 |
| 5,207,251 A | | 5/1993 | Cooks ............................ 41/83 |
| 5,210,769 A | * | 5/1993 | Seidel et al. ................. 73/295 |
| 5,375,508 A | | 12/1994 | Knepler et al. .............. 99/280 |
| 5,388,501 A | | 2/1995 | Hazan et al. ................. 99/285 |
| 5,449,144 A | | 9/1995 | Kowalics ..................... 251/99 |
| 5,563,584 A | * | 10/1996 | Rader et al. ................ 340/618 |
| 5,604,315 A | * | 2/1997 | Briefer et al. ........... 73/861.49 |
| 5,661,228 A | | 8/1997 | Young ........................... 73/40 |
| 5,704,275 A | | 1/1998 | Warne ......................... 99/281 |
| 5,705,747 A | | 1/1998 | Bailey ......................... 73/290 |
| 5,802,910 A | | 9/1998 | Krahn et al. ................. 73/299 |
| 5,862,738 A | | 1/1999 | Warne ......................... 99/281 |
| 5,901,635 A | | 5/1999 | Lucas et al. ................. 99/283 |
| 5,944,225 A | | 8/1999 | Kawolics .................... 222/131 |
| 6,105,437 A | * | 8/2000 | Klug et al. ................... 73/756 |

(Continued)

FOREIGN PATENT DOCUMENTS

GB 2014868 A * 9/1979

(Continued)

*Primary Examiner*—Hezron Williams
*Assistant Examiner*—John Fitzgerald
(74) *Attorney, Agent, or Firm*—Barnes & Thornburg LLP

(57) ABSTRACT

Disclosed is a fluid level gauge for sensing the level of fluid in a dispenser. The level gauge includes an inlet port communicating with the fluid and a check valve in communication with the inlet port. The check valve includes a membrane which allows air to pass. The level gauge further includes a pressure sensor in fluid communication with the check valve. The fluid level gauge may be used in connection with a beverage dispenser.

25 Claims, 14 Drawing Sheets

U.S. PATENT DOCUMENTS

| | | |
|---|---|---|
| 6,220,091 B1 | 4/2001 | Chen et al. .................... 73/302 |
| 6,234,018 B1 | 5/2001 | Kelada ........................ 73/323 |
| 6,282,952 B1 | 9/2001 | Kawolics ..................... 73/325 |
| 6,298,721 B1 | 10/2001 | Schuppe et al. .............. 73/299 |
| 6,675,654 B1 * | 1/2004 | Hegner et al. ................ 73/715 |
| 6,741,180 B1 * | 5/2004 | Lassota ..................... 340/622 |
| 2001/0032954 A1 | 10/2001 | Kawolics et al. ........... 251/262 |
| 2004/0195263 A1 * | 10/2004 | Lassota ....................... 222/23 |

FOREIGN PATENT DOCUMENTS

| | | | |
|---|---|---|---|
| GB | 2149925 A | * | 6/1985 |

* cited by examiner

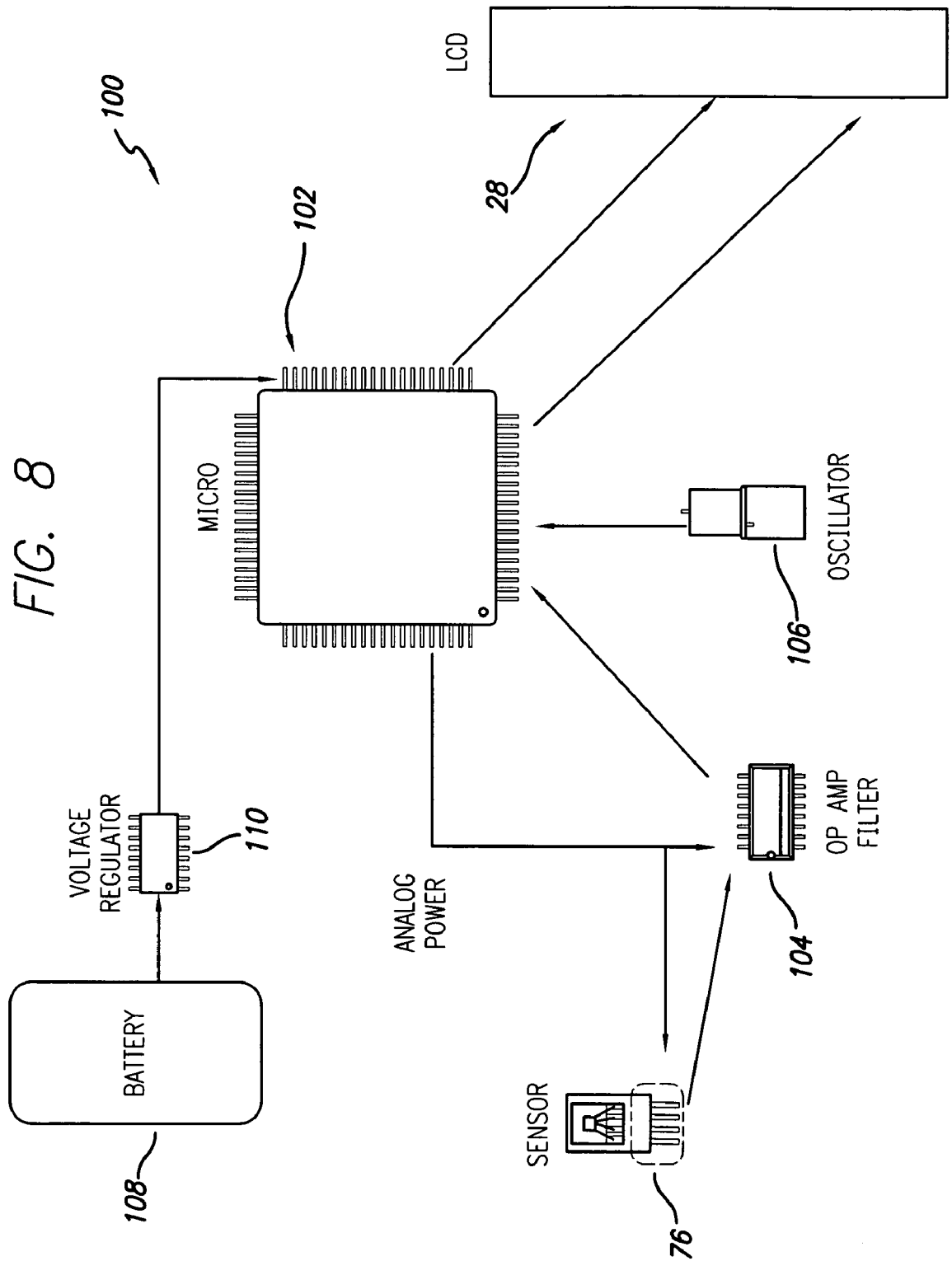

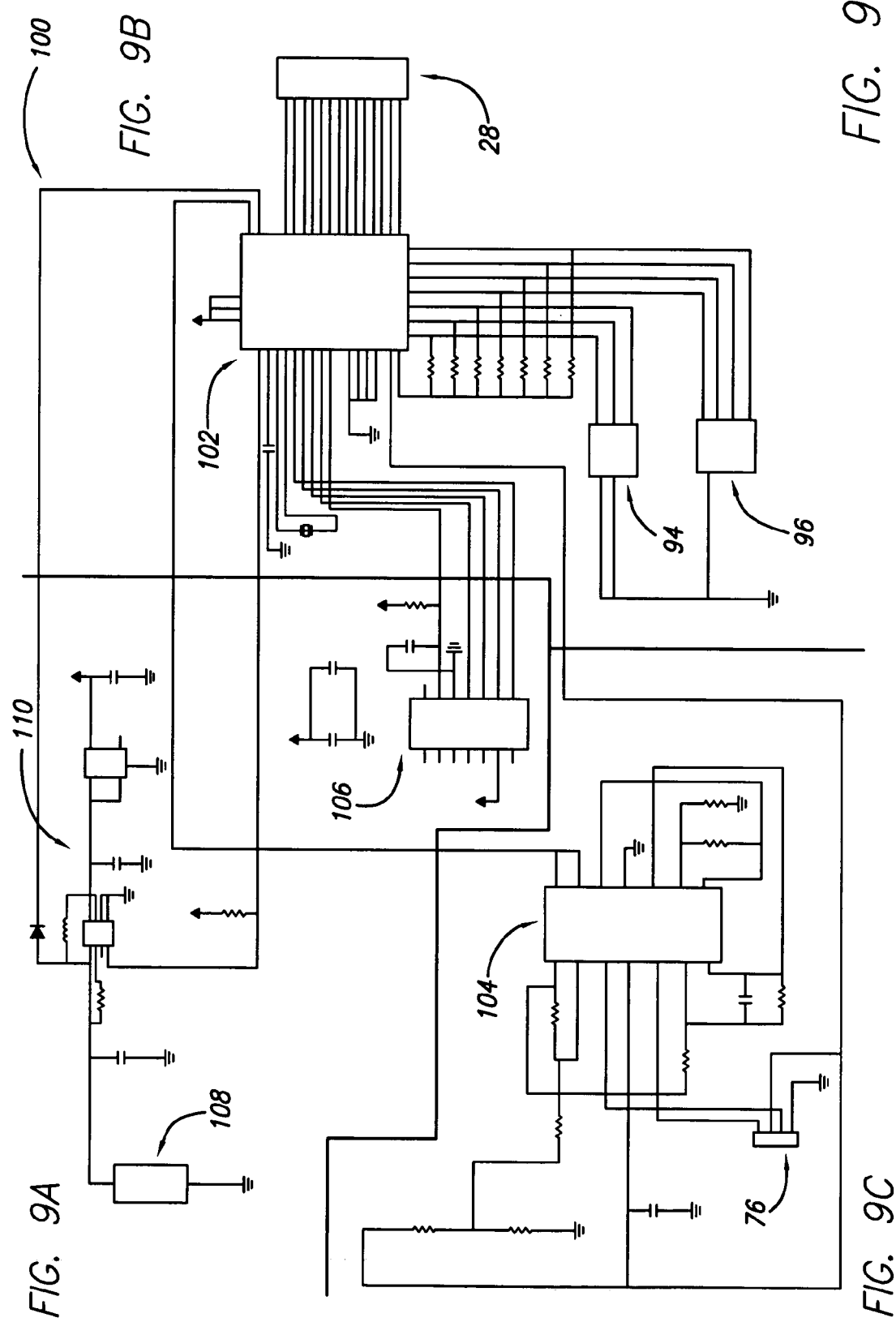

ELECTRONIC LEVEL GAUGE

RELATED APPLICATIONS

This application claims priority to U.S. Provisional application No. 60/460,555 filed on Apr. 4, 2003.

BACKGROUND

The following disclosure relates to a level detecting device and related methods for use with a container or server which holds a quantity of liquid or beverage. The level detecting device detects and displays the level of the liquid in the container.

A variety of beverage devices have been developed which include a sight gauge to identify the level of beverage in a server or container associated with the beverage device. Such a container or server includes a reservoir area which is connected to an outlet tube. The outlet tube extends to a controllable faucet. Such controllable faucets may either be electronic or mechanical. Positioned along the outlet tube is a coupling for mounting a sight gauge or level gauge.

Such sight gauges are typically a generally hollow tubular structure having at least a portion of the tubular structure being transparent. While the entire tubular structure may be transparent, only a portion is required to be transparent or semi-transparent so that the level of liquid in the container can be determined by viewing the level of liquid in the hollow tube. The level of liquid in the reservoir can be "read" or visually identified by the level of liquid in the hollow tube. This is because the level in the tube is generally equal to the level in the reservoir as a result of the tube communicating with the reservoir by way of the outlet tube.

While such configurations are used in the prior art, a potential problem that arises is that the liquid in the hollow tube is usually the first quantity of liquid to be dispensed through the valve when the valve is opened to dispense beverage from the server. This becomes a problem when the beverage is held in the reservoir for a period of time during which the quantity of beverage in the sight tube tends to cool. The quantity of beverage in the sight tube tends to cool because it is external to the reservoir. In contrast, the beverage retained in the reservoir tends to maintain a higher temperature as the reservoir is typically insulated to prevent heat loss. When beverage is dispensed from the server the cooled portion of the beverage in the sight tube is dispensed first. Depending on the quantity of beverage in the sight tube, the cooled beverage may result in a lowering of the temperature of the first cup served after such cooling.

As an additional matter, such sight tubes are prone to breakage as a result of the transparent material being somewhat fragile. Even the plastic materials which are used for such devices may become damaged over time.

As an additional matter, such prior art sight gauges may become visually undesirable to the customer. This may result from the accumulation of material and sediment in the sight tube. While this is generally not a difficult component to clean, the component may not be cleaned from time to time and therefore detrimental to the appearance of the beverage server.

Additional features will become apparent to those skilled in the art upon consideration of the following detailed description of drawings.

BRIEF DESCRIPTION OF THE DRAWINGS

The detailed description particularly refers to the accompanying figures in which:

FIG. 8 is a diagrammatic illustration of components comprising the electronic circuit of the electronic level gauge of the present disclosure;

DETAILED DESCRIPTION OF THE PREFERRED EMBODIMENT

Figure 1:
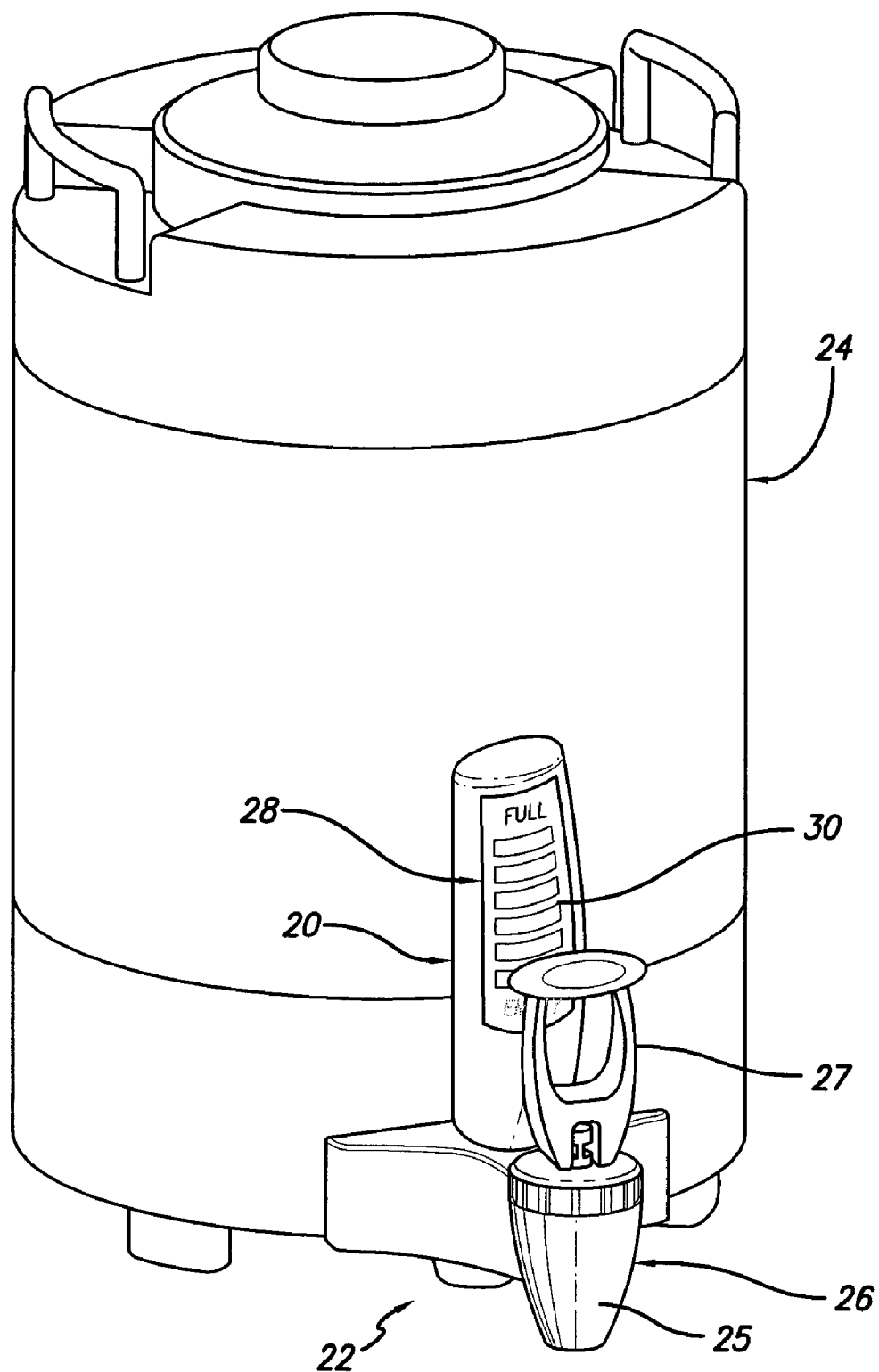
FIG. 1 is a perspective view of a beverage server including a server dispensing valve assembly and an electronic level gauge of the disclosure.

While the present disclosure may be susceptible to embodiment in different forms, there is shown in the drawings, and herein will be described in detail, embodiments with the understanding that the present description is to be considered an exemplification of the principles of the disclosure and is not intended to limit the disclosure to the details of construction and the arrangements of components set forth in the following description or illustrated in the drawings.

With reference to the figures, FIG. 1 shows an electronic level gauge 20 attached to an outlet assembly 22 of a beverage server 24. The outlet assembly 22 is generally of known construction including an outlet tube communicating with the interior reservoir of the server 24 and a controllable valve of a faucet 26 having a nozzle 25 and handle 27. The connection of the outlet tube to the server reservoir and operation of the faucet is of a generally known construction and will be known to one of ordinary skill in the art. The electronic level gauge 20 includes a display 28 to provide indicia 30 relating to the level of beverage in the reservoir of the server 24. The electronic level gauge 20 provides an accurate representation of the contents of the server 24.

Figure 2:
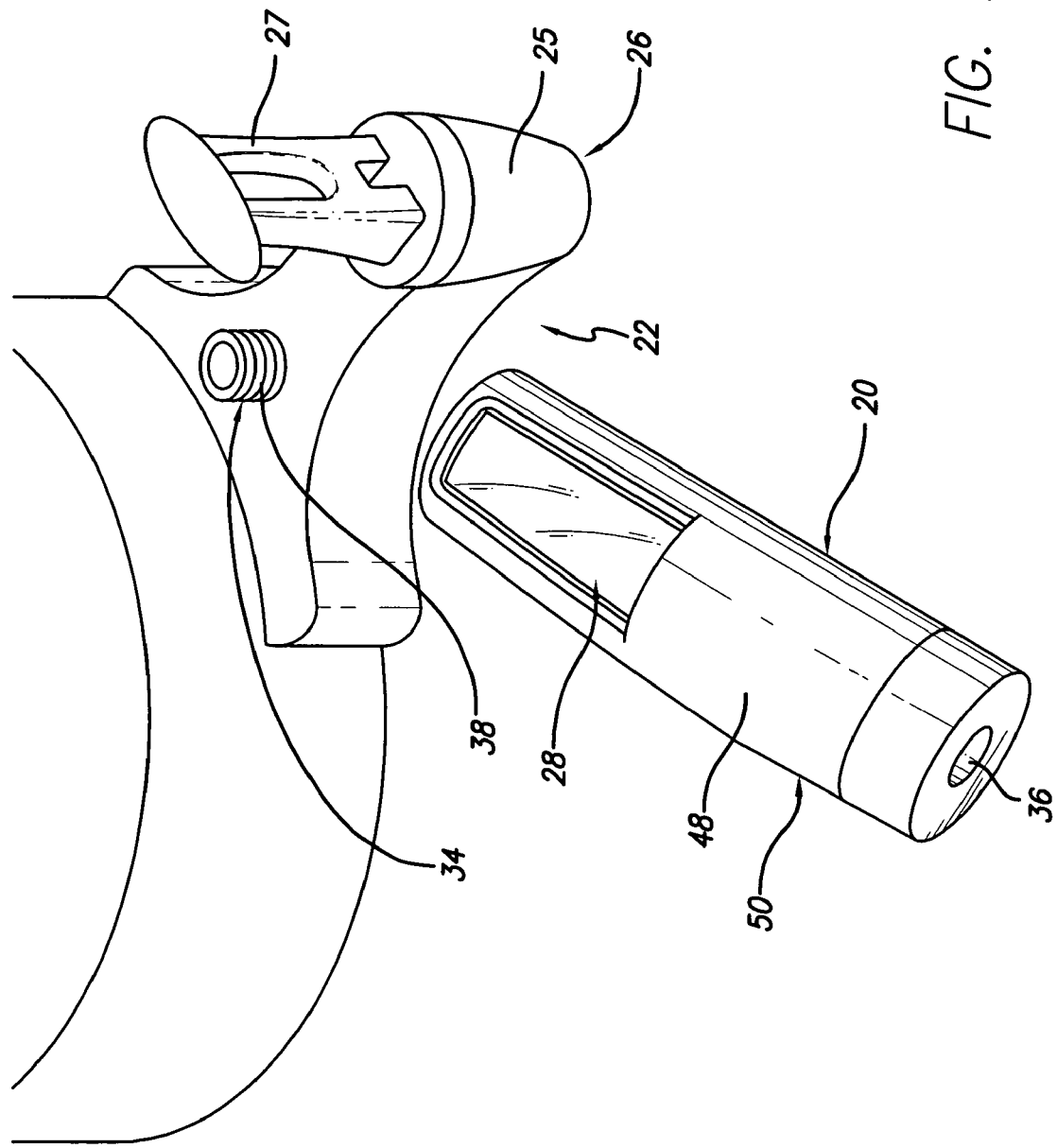
FIG. 2 is a perspective view of a server valve assembly in which the electronic level gauge of the present disclosure has been removed.

With reference to FIG. 2, the level gauge 20 has been removed from the outlet assembly 22. As shown in FIG. 2, a coupling 34 is provided which communicates with the outlet tube extending between the reservoir of the server 24 and the faucet 26. The coupling 34 allows the level gauge 20 to be attached by means of a corresponding mating portion or faucet fitting 36. While the coupling 34 is shown to include threads 38 for attaching the mating portion 36, it is envisioned that other forms of attaching the level gauge 20 to the outlet assembly 22 can be devised.

Figure 3:
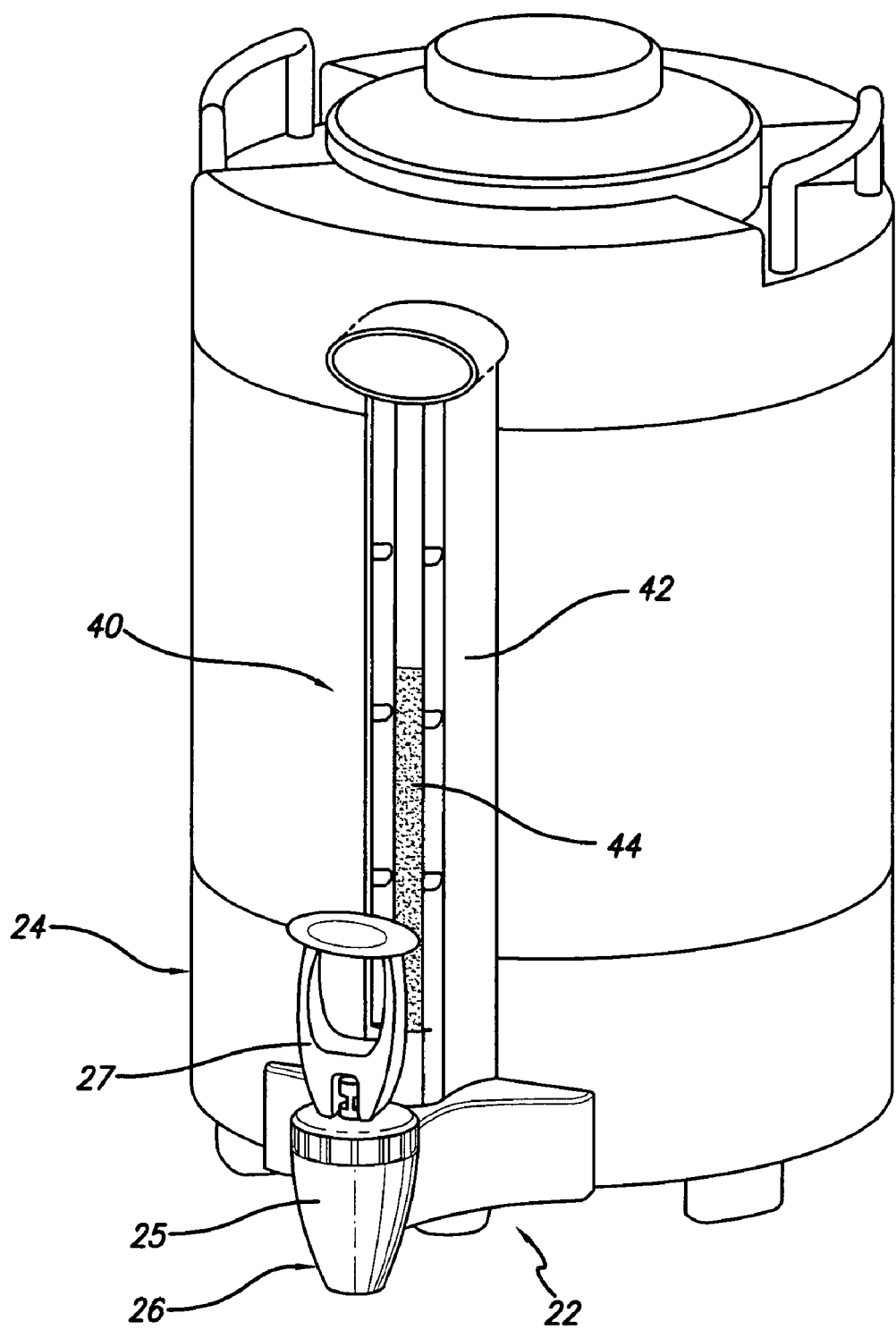
FIG. 3 is a perspective view of a beverage server in which a hollow tube sight gauge is attached to an outlet assembly.

A benefit of attachment of the level gauge 20 by the coupling 34 and faucet fitting 36 is that the level gauge 20 can be interchangeable with a mechanical or liquid level sight gauge as known in the prior art. Such a liquid level sight gauge 40 is shown in FIG. 3 in which the electronic level gauge 20 has been removed from the outlet assembly 22 and replaced with the traditional hollow tube-type sight gauge 40. The hollow tube 44 sight gauge 40 includes a shroud 42 and a hollow tube 44. The hollow tube mates to the coupling 34 to facilitate flow of beverage from the outlet tube through the coupling 34 and up into the hollow tube 44. The level of liquid in the hollow tube 44 corresponds to the level of liquid in the reservoir.

The present disclosure provides a structure which allows for interchangeability of the electronic level gauge 20 with a traditional hollow tube sight gauge 40. This interchangeability allows the owner of a server 24 having a traditional hollow tube sight gauge 40 to replace it with an electronic level gauge 20. Interchangeability is possible because the electronic level gauge 20 is designed to attach to the same outlet assembly configuration used to attach the sight gauge 40.

While a large quantity of beverage does not rise up into the gauge 20, compared to the quantity which may rise in a hollow tube sight gauge 40, the gauge 20 nevertheless senses the pressure of the liquid retained in the server reservoir to produce a signal on the display 28 relating to the relative level in the reservoir. In this regard, the liquid in the reservoir creates hydrostatic pressure on the outlet line. The hydrostatic pressure is proportional to the quantity or volume of liquid retained in the reservoir. As such, a pressure sensing device 76 (see FIG. 5, 7) is used to measure and translate the pressure into a signal which can be used to create a relationship for presentation on the display 28 to identify the level of liquid in the reservoir.

Figure 4:
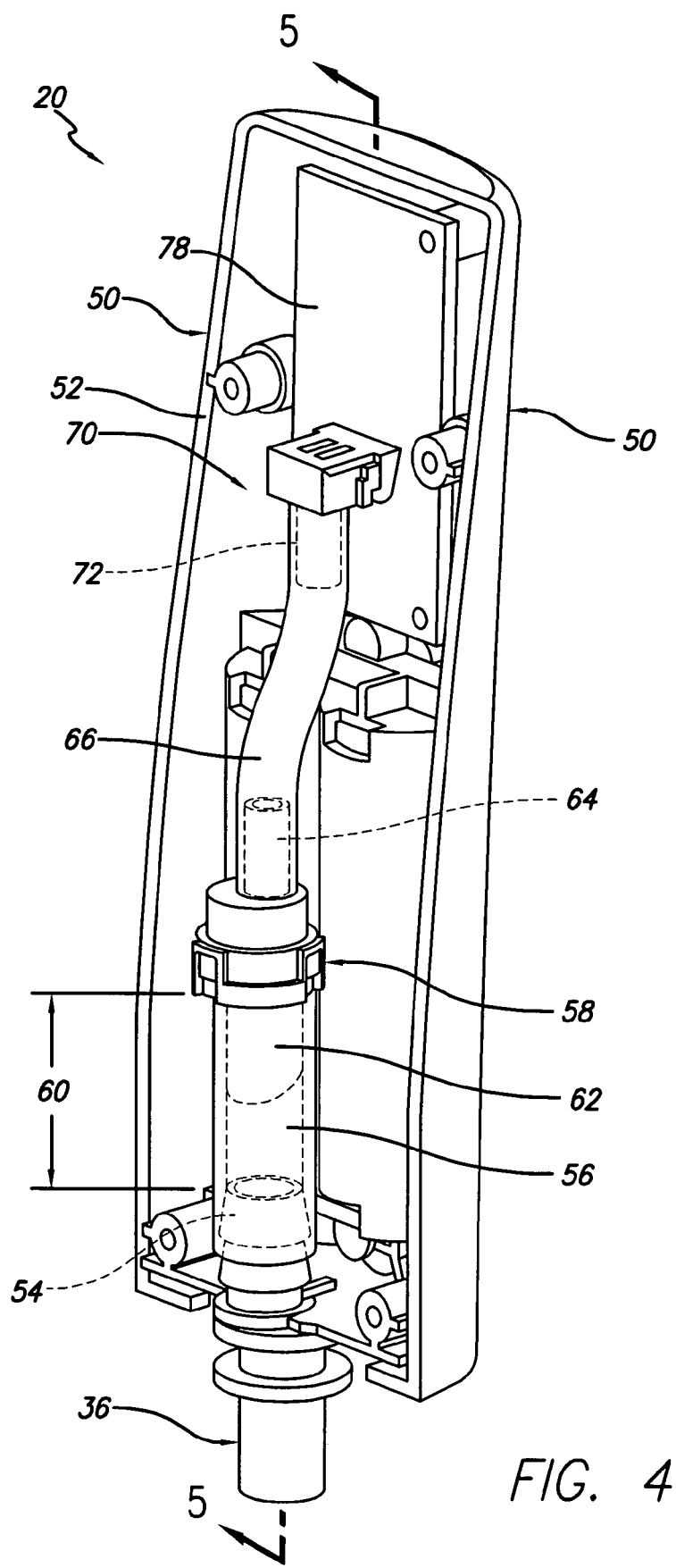
FIG. 4 is a partial fragmentary perspective view of a portion of the assembly of the electronic level gauge of the present disclosure.

With reference to FIG. 4, a front portion 48 of the housing 50 of the sight level gauge 20 has been removed to reveal components comprising the level gauge 20. As shown in FIG. 4, housing 50 also has a rear portion 52. As also shown in FIG. 4, the mating portion or faucet fitting 36 is shown attached to the level gauge 20. A fitting 54 extends upwardly from the coupling 39. A tube 56 attaches to the fitting 54 extends upwardly to a check valve housing 58. The check valve housing 58 allows air pressure to pass therethrough but is generally resistant to the upward passage of a liquid. In this regard, the length 60 of tube 56 between the coupling 39 and the gauge 20 is minimized relative to the prior art hollow tube-type design sight gauge 40.

The check valve housing 58 has a first coupling 62 for mating with the tube 56 and a second coupling 64 for mating with a secondary tube 66. The secondary tube 66 extends upwardly to a pressure sensor assembly 70 which has a sensor coupling 72. The sensor coupling 72 mates with the secondary tube 66. The pressure sensor assembly 70 includes a pressure sensor 76 (see FIG. 5).

Figure 5:
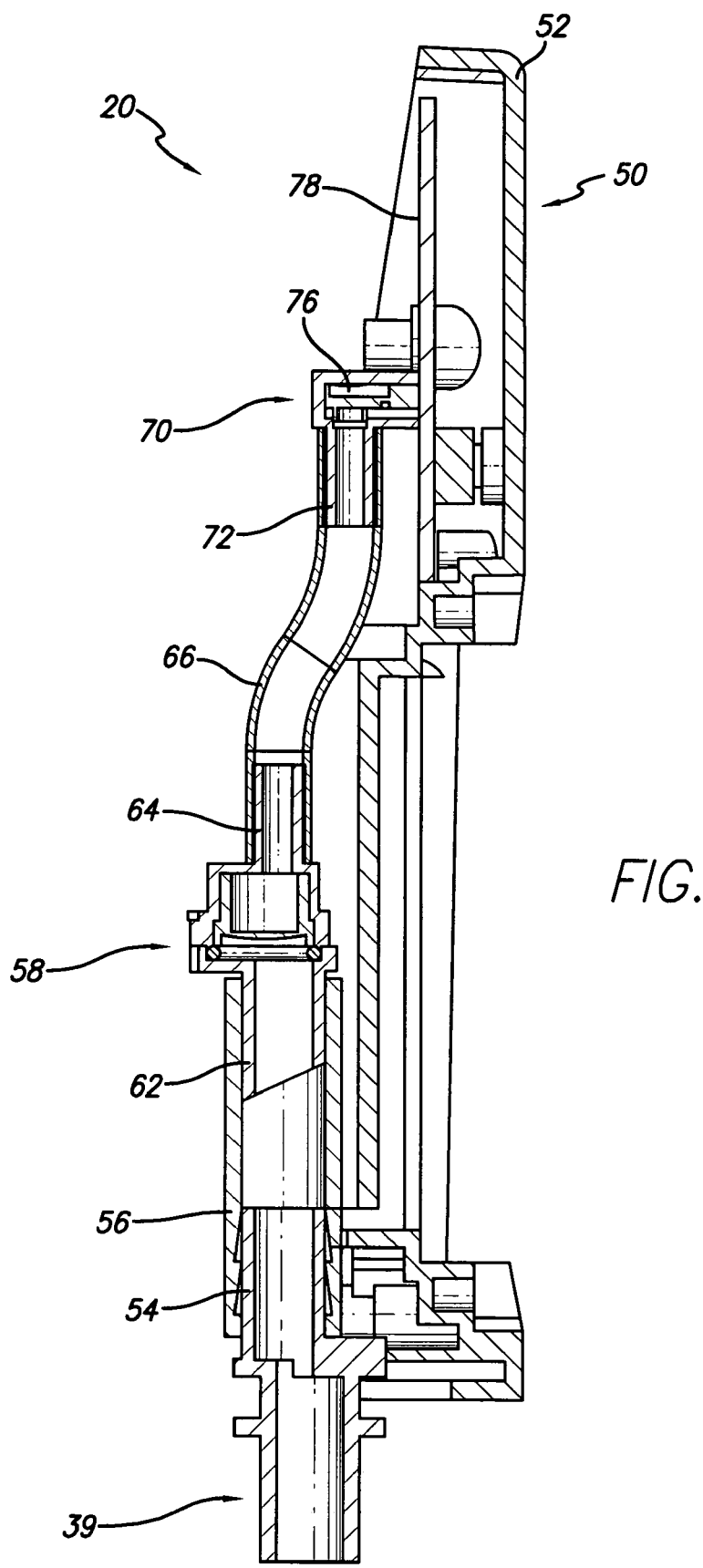
FIG. 5 is a partial cross-sectional side elevational view of the electronic level gauge as shown in FIG. 4 taken along line 5—5 in FIG. 4.

With reference to FIGS. 4 and 5, liquid enters the level gauge 20 through the mating portion 36, fitting 54 and into the tube 56. Liquid is limited to this space as it generally is not permitted to flow past the check valve housing 58. However, the internal operation of the check valve housing 58 (as described in further detail below) allows the pressure imposed by the beverage in the tube 56 to be sensed by the pressure sensor 76 of the sensor assembly 70. The pressure sensor 76 is attached to the circuit board 78 carried on the housing 50. As will be described in greater detail with reference to subsequent figures, the pressure signal sensed at the pressure sensor 76 is used to provide a signal to the display 28 to create appropriate indicia of the level of the beverage in the server.

Figure 6:
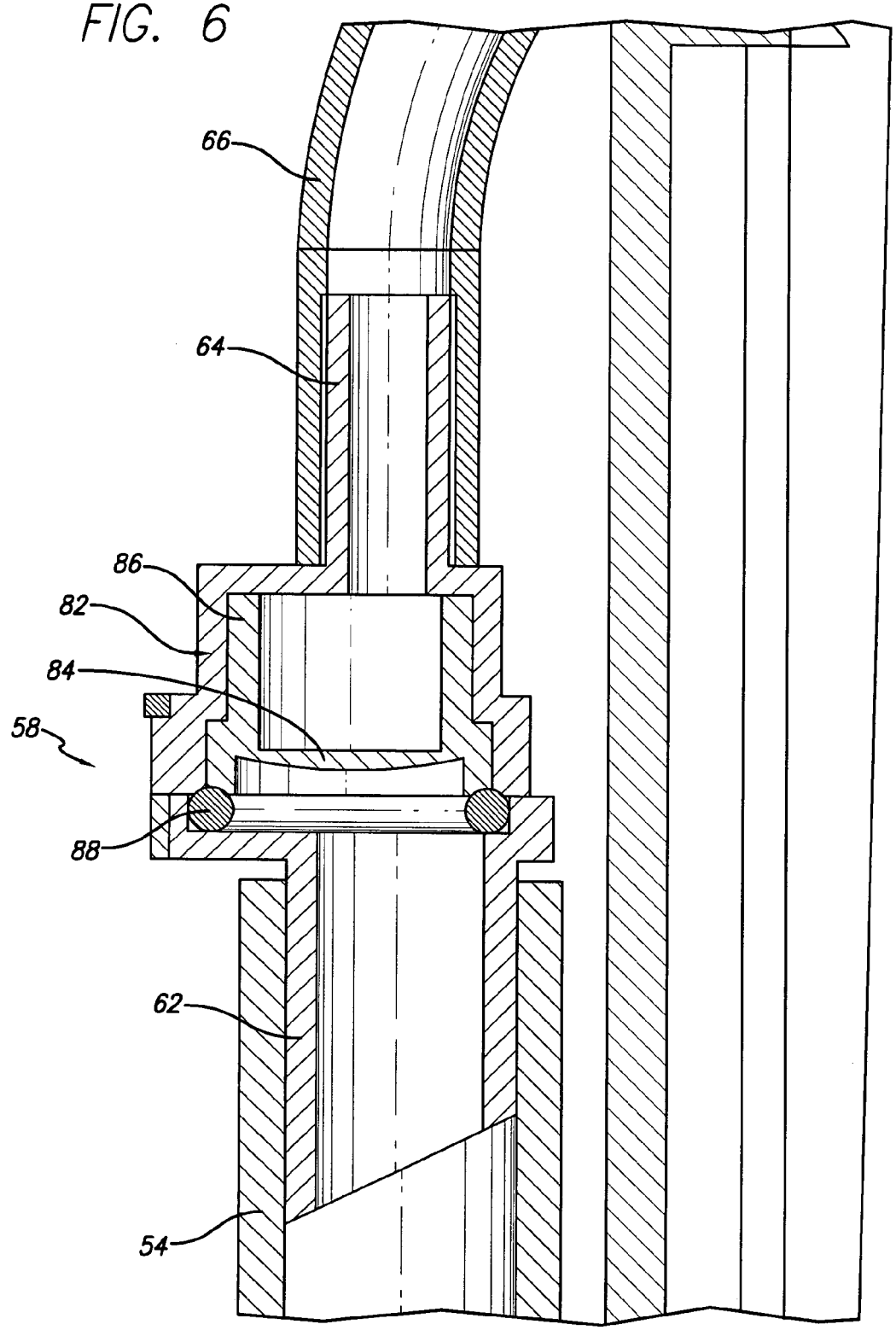
FIG. 6 is an enlarged cross-sectional view of a portion of FIG. 5.
Figure 7:
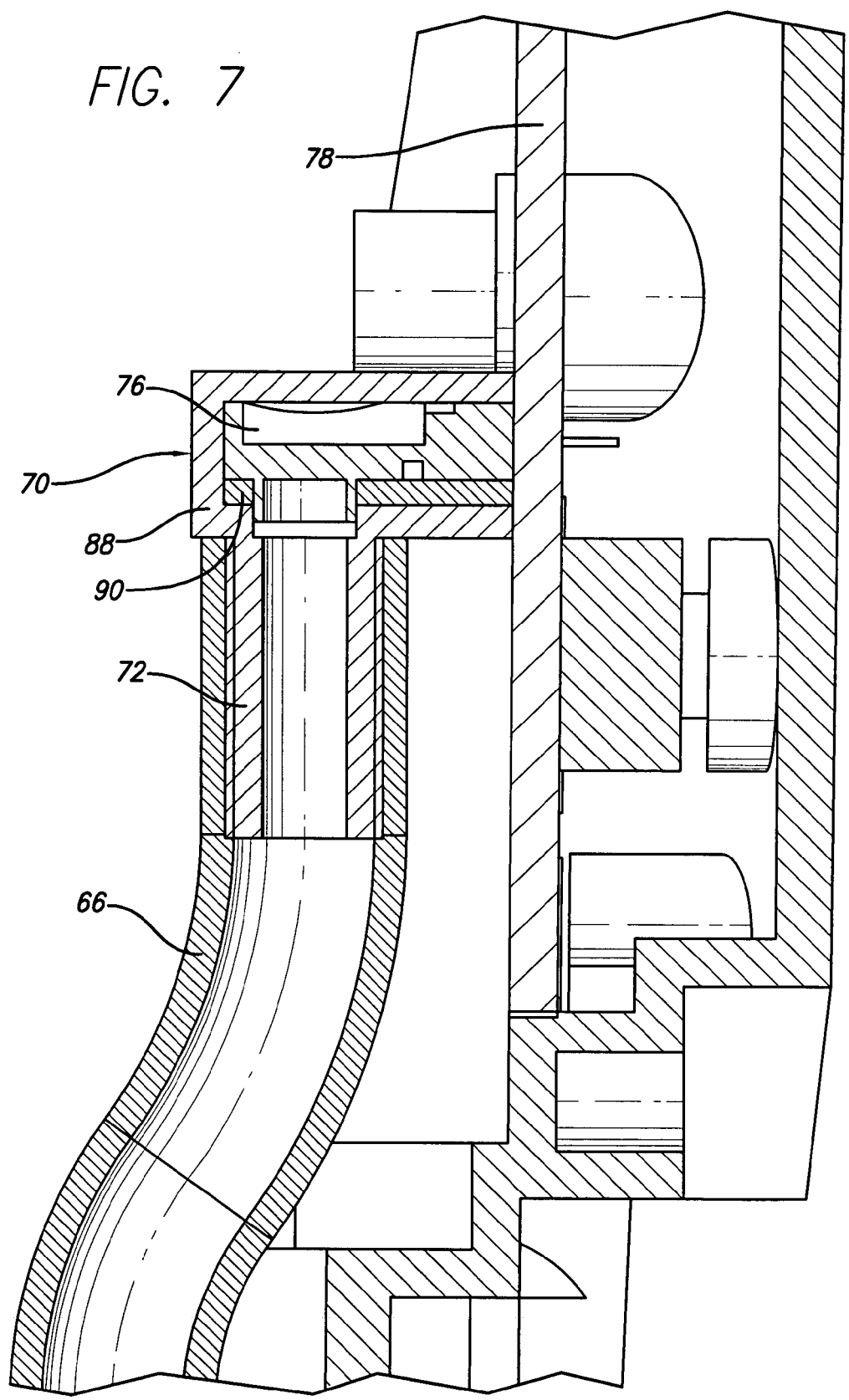
FIG. 7 is an enlarged partial cross-sectional view of a portion of FIG. 5.

As shown in the enlarged views of FIGS. 6 and 7, the tubes are generally formed of an appropriate material for use with food substances such as Norprene® produced by Norton Performance Plastics, Akron, Ohio. Alternatively, the tubes can be formed of Silcon® or other appropriate plastics materials. The check valve housing 58 includes a check valve assembly 82. The check valve assembly may be one of many different forms but is shown as a Duravent® manufactured by W. L. Gore & Associates. The check valve assembly 82 includes a membrane 84, for example, nonwoven polyester membrane, retained in a generally tubular body 86. The membrane 84, limits or controls communication between the tubes on either side. For example, the membrane 84 allows air to pass through but is generally impermeable to water. One skilled in the art will recognize other membrane with different permeability characteristics can be used. An O-ring seal 88 is provided in the housing 58 to provide a liquid seal between the check valve assembly 82 and housing 58.

With further reference to FIG. 7, pressure sensor 76 is retained in a housing portion 88 of the sensor assembly 70. Gasket or seal 90 is provided between the housing 88 and the sensor 76. A port 92 of the sensor 76 positions a sensing element within the sensor 76 in communication with the sensor coupling 72 thereby exposing the sensor 76 to the pressure within the secondary tube 66. The pressure sensor 76 is of a type such as Motorola High Volume Sensor for Low Pressure Applications, device no. MPXC2011 DT1.

Figure 10:
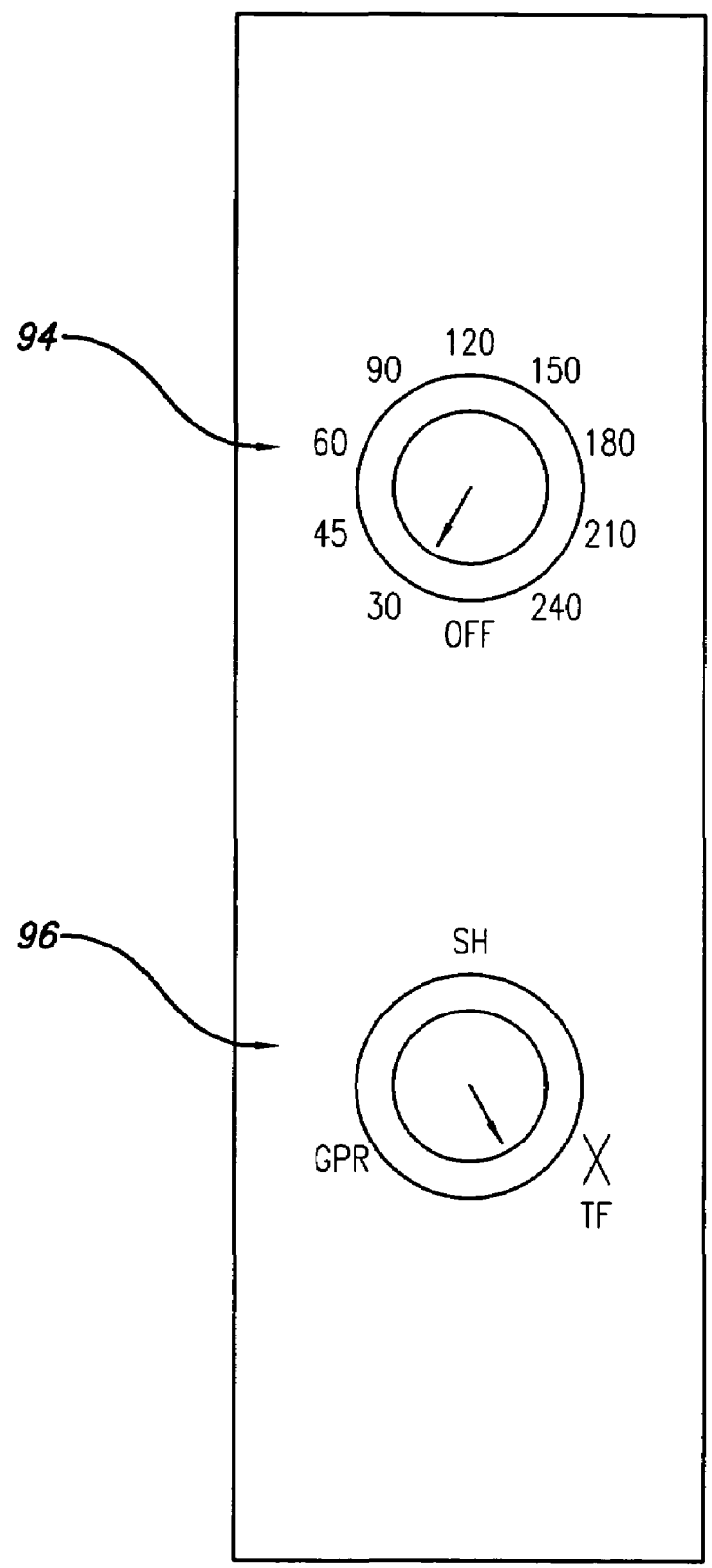
FIG. 10 is a diagrammatic view of a rear portion of the level gauge of the present disclosure.

With further reference to FIGS. 7 and 10, the level gauge 20 includes a pair of control devices including a timer device 94 and an equipment selector 96. The controls as shown in FIG. 10 are connected to the circuit board 78 and can be used to control the system as will be described in greater detail as follows. The timer 94 can be used to select a period of time to "time out" the level gauge 20. As will also be described in greater detail hereinafter, the timer or "freshness timer" can be programmed to be reset when there is a removal of liquid or pressure from the system and upon replacement of liquid or pressure to the system. In other words, once the timer is set for a period of time, for example thirty minutes, the system can terminate the operation of the display 28 by removing the indicia or providing a display that is empty, as well as any other appropriate display, to indicate that beverage should not be dispensed from the server. Also, this time out could be used to indicate a signal to the user to empty the server and add fresh coffee. It is envisioned that one of skill in the art will be able to use the timer 94 in conjunction with the system as described throughout this disclosure to develop other ways of utilizing the timer in relation to the other components in the system described herein. One skilled in the art will recognize the timer 94 can be implemented in a number of ways. For instance, the timer could be a mechanical timer with electrical contacts that can be interfaced with the microcontroller thereby signaling when time expires. Such a timer would include means for adjustment, such as a dial or other selector which could be twisted and set to a predetermined time by the user. The timer could also be an electronic timer with appropriate contacts to interface with the microcontroller. Under such a construction, means to adjust a predetermined time could again include a dial or knob for adjustment by the user to a predetermined time, or a touch pad could be employed where the user would press keys in order to adjust the time, the time selected being displayed on an electronic display such as an LCD, or LED display. Yet another embodiment, the timer could be incorporated into the microprocessor with an interface or means to adjust the predetermined time, such as the dial and touch pad previously described.

The equipment selector 96 is provided so as to allow a single level gauge 20 to be used with a variety of different pieces of equipment or sizes or dimensions of the reservoir. While three different pieces of equipment are shown associated with the equipment selector 96 in FIG. 10, it is envisioned that other forms of selector could be used to select additional equipment. The level gauge 20 uses the selection at the equipment selector 96 to calibrate the gauge 20 to the unique height and volume relationship of the selected type of server. Once the selection is made the signal received from the sensor 76 properly corresponds to the piece of equipment selected at the selector 96. The gauge 20 can be originally calibrated for one type of server or multiple servers as shown.

For example, a pressure reading relating to the level of liquid in a large capacity server does not directly correlate to the same pressure reading in a small capacity server. For this reason, the selector 96 and the programming associated therewith, allows the gauge 20 to be used with a variety of different pieces of equipment. This solves the problem of having one electronic gauge 20 designed for each piece of equipment. This solution greatly expands the applicability of the level gauge 20 to a variety of products. Moreover, it is foreseeable that a single level gauge 20 can be designed for a variety of equipment produced by a variety of manufacturers. In this regard, if one manufacturer wishes to use the level gauge, the system can be calibrated to that manufacturer's equipment and a selector choice can be added to the selector 96. One skilled in the art will recognize that the equipment selector or calibration means, can be implemented in a number of ways. In one embodiment, the microprocessor 102, includes appropriate programming to scale or calibrate either the signal received from the pressure sensor 76, or scale the signal sent to the display 28. In other embodiments, additional components are included external to the microprocessor, to scale the signal from the sensor, or to scale the signal going to the display.

Figure 9A:
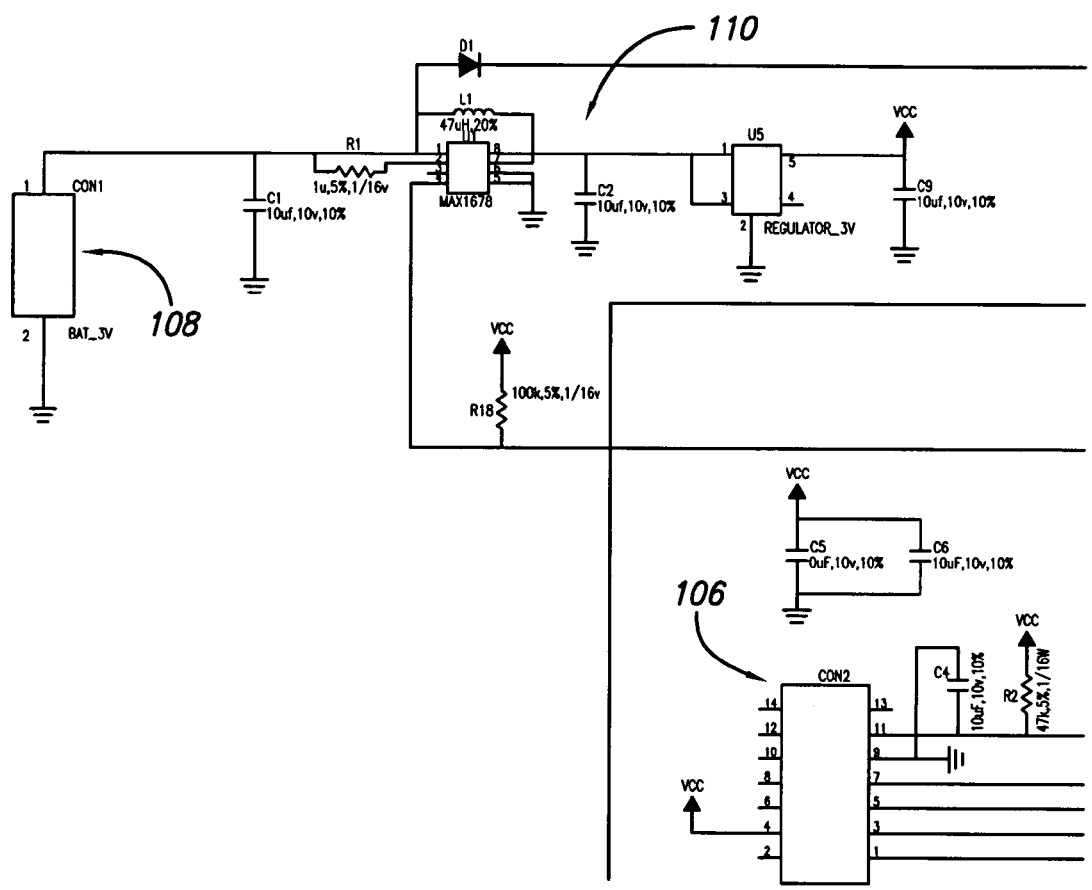
FIG. 9 is a schematic of the circuit used in the electronic level gauge of the present disclosure.
Figure 9B:
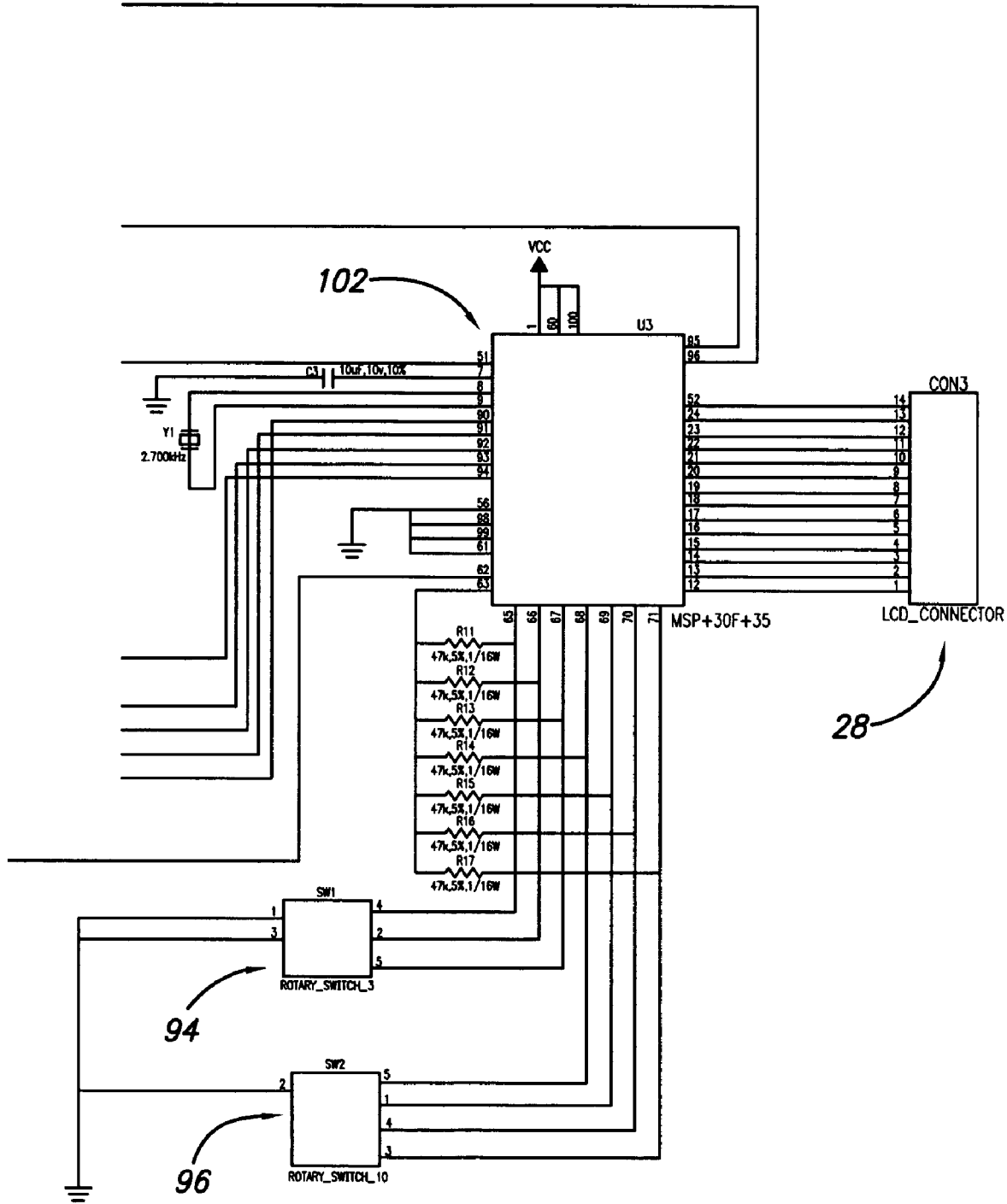
Figure 9C:
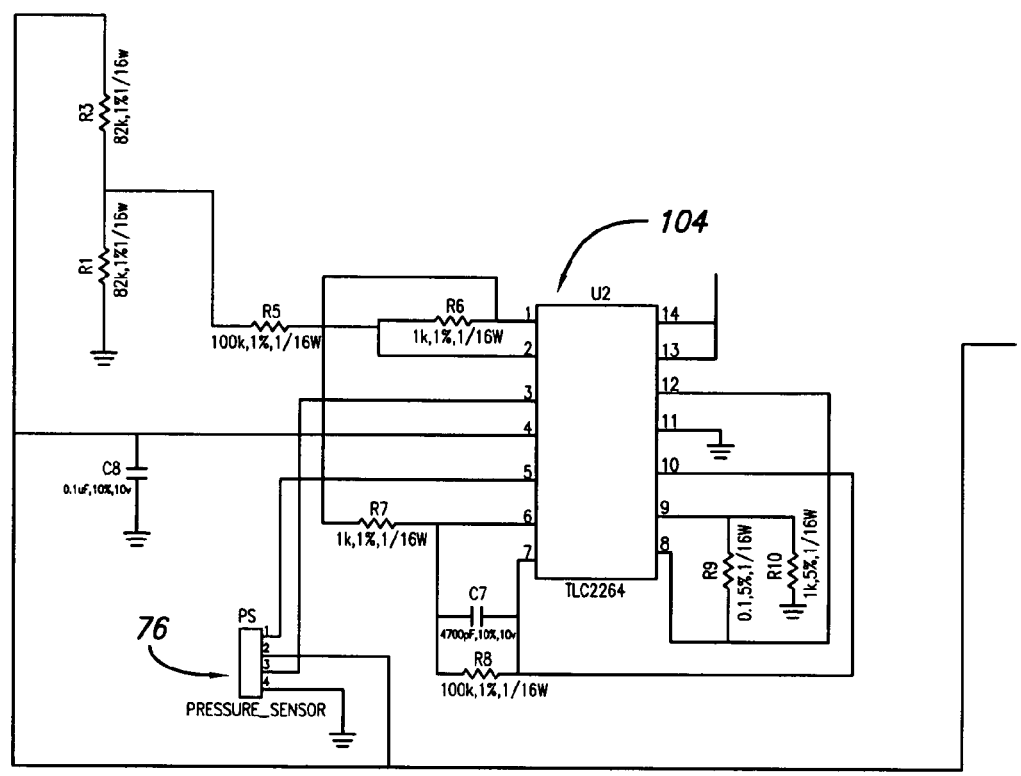

With reference to FIGS. 8 and 9, the system 100 carried on the level gauge 20 includes a microprocessor 102. The microprocessor 102 is coupled to the display 28. The sensor 76 is coupled to the microprocessor 102 as well as an op amp filter 104. An oscillator 106 is provided to turn off the system in the event of an empty server. By shutting off an empty server power is conserved. Power is provided by a battery 108 which provides power through a voltage regulator 110 to the microprocessor 102. Power for the display 28 is provided only through the microprocessor 102 so as to extend the battery life of the system 100.

Figure 11:
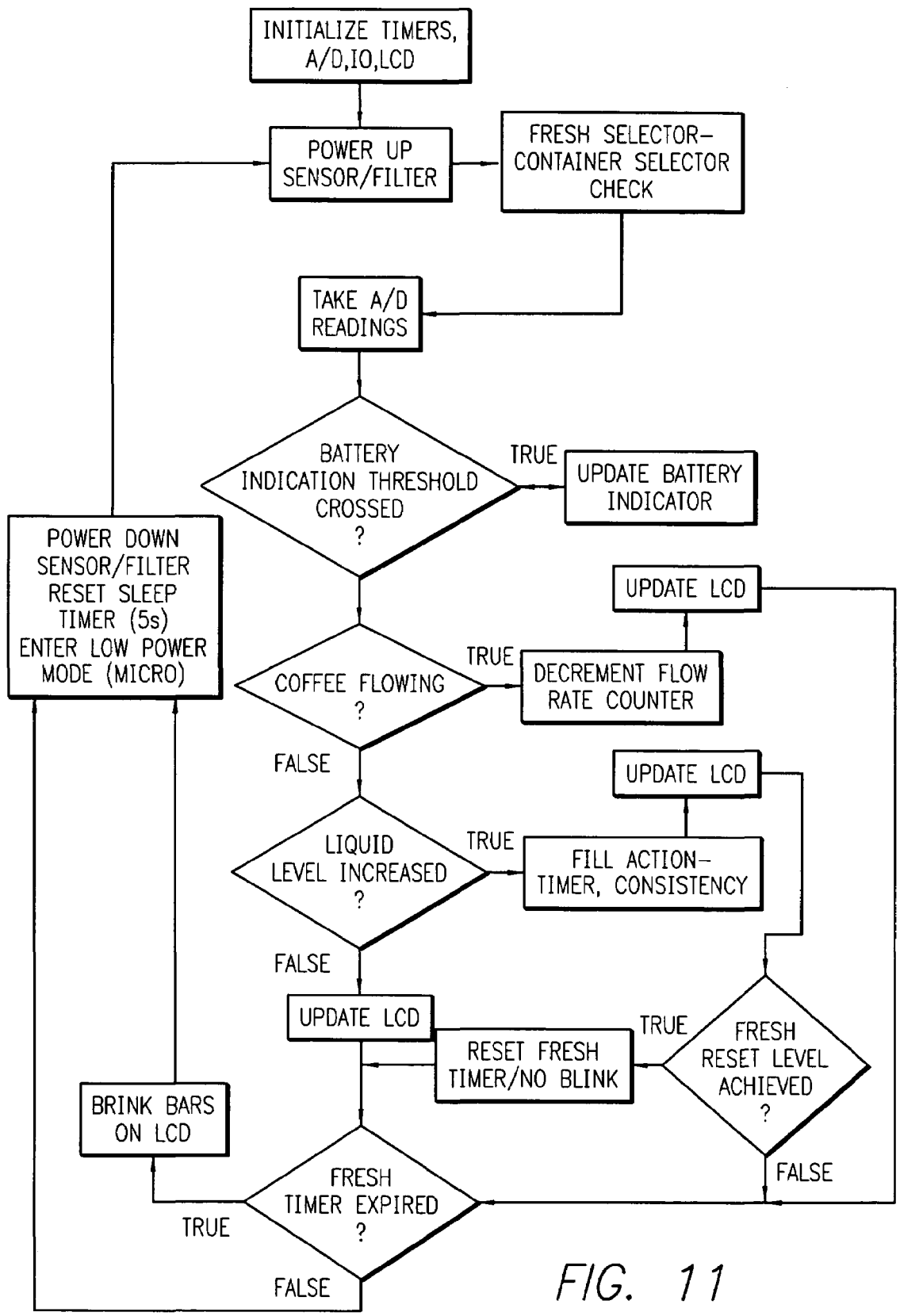
FIG. 11 is a flow diagram of a mode of operation of the disclosed level gauge.

With reference to FIG. 11, a flow diagram is provided to indicate some of the features of the disclosed level gauge 20. The flow diagram as disclosed in FIG. 11 will provide teachings to one of skill in the art to further elaborate on the control and operation of the level gauge 20. With reference to FIG. 11, the flow or software built into the system 100 is designed to provide information on the display 28 about the level of beverage in the server, freshness of the beverage and is designed to maintain and maximize battery life. The flow chart indicates that the microprocessor 102 (see FIG. 8) initializes timers and ports. The microprocessor then proceeds to power the pressure sensor 76 and op amp 104 to take analog digital conversion (ADC) readings. The system 100 takes several readings (for example 5) to reduce error caused by slightly varying signal. Based on these readings, the microprocessor will update the display 28 accordingly.

If beverage or "coffee" is being dispensed from a server or "flowing", the sensor 76 pressure falls to 0. When this pressure change occurs, the microcontroller 102 then starts a timer to reduce or decrement the level on the display based on a predetermined flow rate stored at the microcontroller. This process eliminates a sudden drop in level on the display. This sudden drop is one of the problems with the prior art which is resolved by this process and apparatus. The predetermined flow rate can be calculated based on the physical parameters of the outlet assembly 22 including the faucet 26. While there may be some variation in flow based on hydrostatic pressure within the server depending on whether the server is full or nearly empty, a numerical assumption can be made to provide a predetermined flow rate.

When flow stops, and dispensing has ceased, the microcontroller 102 takes an actual pressure reading from the sensor 76 and adjusts the level at the display 28 to provide an accurate display of the contents of the server.

With further reference to the flow chart of FIG. 11, hot beverage freshness is determined. If the level of beverage has increased over a specified reference level, such change would indicate that the container has been refilled and the freshness timer should be reset. If the microcontroller determines that the level has not increased for a certain amount of time then the display 28 will provide a response signal to indicate that the freshness timer has expired. This signal can be made to be presented as extremely obvious to any party viewing the display or may be manifested in a more subtle form so that consumers dispensing from the server will not know the meaning of the signal. Generally, a freshness timer is set based on some range freshness time. As such, it may be desirable to not provide a blatant signal of the expiration of the freshness timer so as not to alarm consumers. The freshness timer can be set to expire well before the true freshness life of the beverage. This will allow for some margin of delay to allow the operator to replenish the supply. For example, after the freshness time has expired the display can be programmed to flash, or provide text messages indicating that the timer has expired. The means to adjust the freshness timer can be an input pad connected to the microcontroller 102, a rotary switch 94, or any other electrical device that allows for the selection of multiple values.

If the beverage has not been refilled or refreshed over a specified duration of time, the display will cease its signal and turn on an alarm in the form of a visual or auditory alarm. This will alert the operator in the event the operator failed to notice the initial alert. The specified duration of time may be different than the amount of time related to the triggering of the response signal.

As an additional step, the controller 102 will power down the pressure sensor 76 and op amp 104 and go into a "sleep mode" for 5 seconds. The controller 102 will then reactivate the system 100 after a 5 second delay. The process shown in FIG. 11 and described above will then be reinitiated. The system provides a loop of continually checking the status of the coffee to inform the user while maintaining adequate battery life.

The electronic level gauge 20 provides a useful interface that lets the user of the server 24 know how much beverage such as coffee remains in the server. The gauge 20 is also programmed and operates to indicate the freshness of the coffee and the level of battery power. The pressure sensor 76 is powered directly from the controller 102 and converts pressure sensed at the port into an electrical signal. The signal is then processed through a signal conditioning circuit including the op amp 104 to amplify and filter the signal for use by the microcontroller 102. The controller 102 converts the signal 108 from analog to digital. Based on the voltage level sensed by the controller, the controller will drive the appropriate portions of the display 28 to indicate the level of beverage in the server. The battery power level is also monitored by the controller to inform the user when batteries are low and need to be replaced. Another feature that is incorporated on the display is a freshness indicator. Based on pressure changes over time, the microcontroller 102 will determine if the beverage is fresh.

While a preferred embodiment of the disclosure is shown and described, it is envisioned that those skilled in the art may devise various modifications and equivalents without departing from the spirit and scope of the disclosure.

We claim:

1. A fluid level gauge for sensing the level of fluid in a dispenser, comprising:
    an inlet port in communication with the fluid;
    a check valve communication with the inlet port said check valve including a membrane, the membrane allowing air to pass;
    a pressure sensor in fluid communication with the check valve.

2. The fluid level gauge of claim 1, where the membrane is a non-woven polyester membrane.

3. The fluid level gauge of claim 1, further including means for calibrating the gauge.

4. The fluid level gauge of claim 1, further including a display for displaying indicia related to the level of fluid sensed, said display electrically connected to the pressure sensor.

5. The fluid level gauge of claim 4, further including means for eliminating a sudden drop in a level indicia on the display.

6. The fluid level gauge of claim 4, further including a timer circuit electrically connected to a display to indicate the expiration of a pre-determined time period.

7. The fluid level gauge of claim 6, wherein said timer circuit is reset upon removal of pressure and replacement of pressure, as sensed by the sensor.

8. A fluid level gauge for a beverage dispenser including:
    a first tube in communication with the beverage dispenser at a first end, and in communication with a check valve at a second end;
    a second tube in communication with the check valve at a first end, and in communication with a pressure sensor at a second end;
    the check valve including a membrane positioned to limit communication
    between the first tube and the second tube; and
    a display for indicating the level of fluid in the beverage dispenser, the display electrically connected to the sensor.

9. The fluid level gauge of claim 8, where the membrane is a non-woven polyester membrane.

10. The fluid level gauge of claim 8, further including timing means electrically connected to a display to indicate the expiration of a pre-determined time period.

11. The fluid level gauge of claim 8, further including means for processing signals generated by the sensor, the means for processing also providing a signal to the display, said signal related to the level of fluid in the dispenser.

12. The fluid level gauge of claim 8, further including a microprocessor electrically connected between the display and the pressure sensor.

13. The fluid level gauge as claimed in claim 12, wherein the microprocessor powers down the pressure sensor for a predetermined time, and reapplies power after a predetermined time passes.

14. The fluid level gauge of claim 12, further including a signal conditioning circuit electrically connected between the pressure sensor and microprocessor.

15. The fluid level gauge of claim 12, further including the microprocessor processing signals from the pressure sensor and providing a signal to the display to indicate the level of fluid in the dispenser.

16. The fluid level gauge of claim 15, wherein in the microprocessor monitors the signals from the pressure sensor, determines that the level in the dispenser has not increased for predetermined amount of time, and provides a response signal to a display.

17. The fluid level gauge of claim 16, further including means to adjust the predetermined time.

18. The fluid level gauge of claim 16, wherein the microprocessor further monitors the pressure sensor and determines if the level in the dispenser has not increased for a second predetermined time, and provides a signal to activate an alarm.

19. The fluid level gauge of claim 18, where the alarm is a visual indicator.

20. The fluid level gauge of claim 18, where the alarm is an audio indicator.

21. An apparatus for displaying the level of fluid in a beverage dispenser, including:
    a battery;
    a voltage regulator electrically connected to the battery;
    a microcontroller electrically connected to draw power from the voltage regulator;
    a display electrically connected to the microcontroller;
    an oscillator electrically connected to the microcontroller;
    a pressure sensor electrically connected to the microcontroller, the sensor providing a signal related to the pressure sensed by the sensor;
    a conduit in fluid communication with the beverage to be dispensed, the pressure sensor operably connected to the conduit so as to sense the pressure therein; and
    a membrane located in the conduit, and positioned to limit the communication of beverage within the conduit.

22. The apparatus of claim 21, further including an operational amplifier filter, electrically connected between the microcontroller and the pressure sensor.

23. The apparatus of claim 21, further including an analog to digital converter electrically connected to receive analog signals from the sensor and deliver digital signals to the microcontroller.

24. The apparatus of claim 21, further including a re-settable timer, the timer starting when the beverage level in the dispenser increases.

25. The apparatus of claim 24, including a timer and a display, the display displaying indicia upon expiration of the timer.

* * * * *